E. HÄHNLEN.
MAGNETO.
APPLICATION FILED AUG. 22, 1912.
1,104,795.
Patented July 28, 1914.
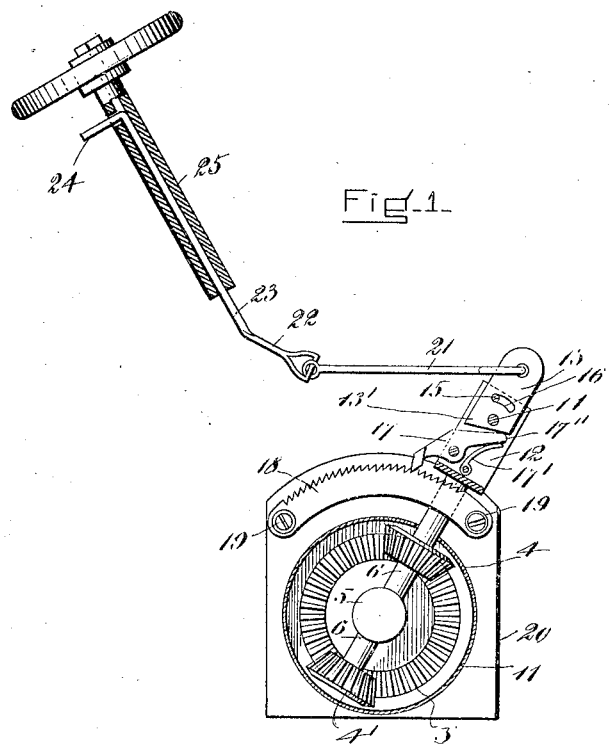
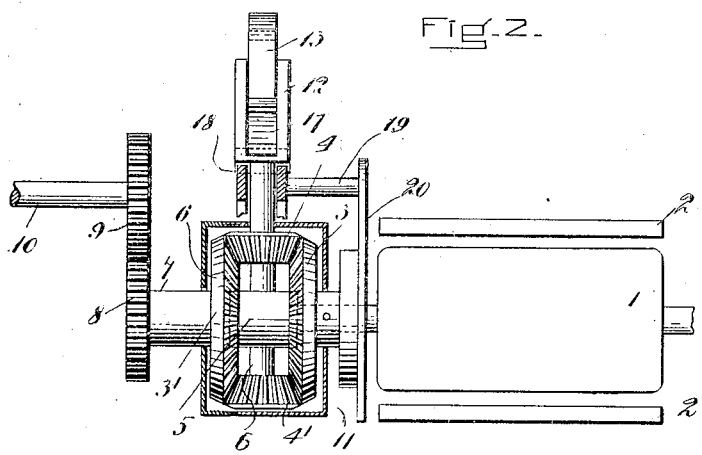

UNITED STATES PATENT OFFICE.

EWALD HÄHNLEN, OF ROXBURY, MASSACHUSETTS, ASSIGNOR TO HOLTZER-CABOT ELECTRIC COMPANY, A CORPORATION OF MASSACHUSETTS.

MAGNETO.

1,104,795.

Specification of Letters Patent.  Patented July 28, 1914.

Application filed August 22, 1912. Serial No. 716,362.

*To all whom it may concern:*

Be it known that I, EWALD HÄHNLEN, a subject of the German Emperor, and a resident of Roxbury, in the county of Suffolk and State of Massachusetts, have invented a new and useful Improvement in Magnetos, of which the following is a specification.

The present invention relates to an ignition system for motor vehicles, and its object is to provide a device whereby the so-called " double system " may be eliminated.

The drawings which accompany and form a part of this specification illustrate one embodiment of my invention.

In the drawings, Figure 1 is a front elevation with the front of the gear casing removed and with certain parts shown more or less diagrammatically. Fig. 2 is a side elevation of the device shown in Fig. 1 with certain parts in section.

In the particular drawings selected for more fully disclosing my invention, 1 represents the armature of a magneto generator provided with the usual field magnets, 2, and having its shaft rigidly secured to the bevel gear 3. The hub 5 which carries the studs 6 of the small bevel gears 4 4', is shown in the present instance as having a bearing in the faces of the bevel gears 3 3'. The shank 7 of the bevel gear 3' carries the gear 8, which, in turn, meshes with the gear 9 secured to the shaft 10, arranged to be driven by any suitable part of the engine.

It will be understood, of course, that any suitable arrangement of differential gearing may be used to connect the magneto shaft with the drive shaft 10, and that the particular arrangement above specifically described may be varied without departing from the principle of my invention.

Preferably, the differential gear is inclosed in a casing 11.

The stud 6 is extended beyond the bevel gear 4 and terminates in the fork 12, between the prongs of which are pivoted the pawl 17 and the lever 13. The pawl 17 preferably is maintained against the teeth of the ratchet 18 by means of the spring 17'. The lever 13 is pivoted at 15, and its motion is limited by the pin and slot 15, 16. The ratchet 18 is secured to any stationary part of the device, and, in the present instance, is shown as attached by means of the studs 19 to the upright plate 20.

The pivoted lever 13 is arranged to be operated by means of a lever associated with the steering post, and, in the present instance, I have illustrated more or less conventionally a link 21 connecting said lever 13 with the crank 22, which extends approximately at right angles from the rod 23. The rod 23 in the present instance is shown as passing through the steering post 25 and terminating in a handle or lever 24, although it will be readily understood that any of the usual forms of levers whereby the operator of an automobile may " shift his spark " can be employed for the purpose of manually actuating the magneto in accordance with my invention.

The operation is as follows: When the engine is running, power will be transmitted to the magneto by means of the shaft 10, gearing 8 and 9, or other suitable power transmission means, and the differential gearing above described. The rod 6, for any particular adjustment of the timer, is held in fixed position by the pawl and ratchet. To change the time at which a spark occurs, the lever 24 is rotated, and if the direction of rotation be such that the link 21 moves to the right, the rod 6 will move backward, the pawl slipping over the ratchet teeth; but if the lever 24 be rotated in the opposite direction, the lever 13 is moved forward about its pivot 14, and its toe 13', operating upon the arm 17'' of the pawl, will remove the latter from the teeth and enable the rod 6 to move forward about the journals of its hub 5. In this manner, the mechanism which determines the timing of the spark (not shown) may be adjusted, as well understood by those skilled in the art.

Heretofore, so far as I am aware, sparking systems which employed magnetos required the use of induction coils and energizing batteries for the purpose of starting the engine, and these devices have proven more or less objectionable. By means of the present invention, no such auxiliary to a magneto ignition system is required. In order to start a machine, the operator oscillates the lever 24 a few times backward and forward, thereby causing the armature 1 to oscillate at a rapid rate a corresponding number of times, consequently developing a spark in the appropriate cylinder for each oscillation. Inasmuch as the shaft 10, which is secured to some rotating part of the engine, such, for instance, as the cam shaft, is stationary when the engine is not in operation, the bevel gear 3' also will remain stationary during the oscillation of the rod 6. Consequently, the small gears 4 4' will cause the gear 3 to rotate, because there is less friction between the gear 3 and the small bevel gears than there is between the gear 3' and said small bevel gears.

I prefer to make the ratio of the diameters of the large and small bevel gears about two to one, so that when the rod 6 is vibrated backward and forward as above described, the speed of the armature 1 will be twice that of the small bevel gears. In this way, the potential necessary to operate the spark plugs may easily be obtained.

It will be understood that the particular devices shown and described may be subjected to a wide range of variation without departing from the principle of my invention.

I claim—

1. In a motor vehicle the combination with a magneto generator of driving means for said generator, differential gearing connecting said driving means and magneto, a pawl and ratchet for maintaining the members of said differential gearing in fixed position, a pivoted lever arranged to throw said pawl out of coöperation with said ratchet, and means associated with the steering post of said motor vehicle for actuating said pivoted lever.

2. In a motor vehicle the combination with a magneto generator of driving means for said generator, a gear actuated by said driving means, a gear fixed to said generator, a gear meshing with said gears, a stud carrying the last mentioned gear, a pawl having pivotal connection with said stud, a ratchet coöperating with said pawl, and means for throwing said pawl out of engagement with said ratchet.

3. The combination with a magneto generator, of driving means therefor, a gear actuated by said driving means, a gear fixed to the generator, a stud pivoted centrally of said gears, a gear carried by said stud and meshing with said gears, a stationary segmental ratchet, a spring pressed pawl carried by said stud normally engaging the teeth of said ratchet, means for rotating said stud about its pivot, and means for simultaneously releasing said pawl from engagement with the teeth of said ratchet.

In testimony whereof, I have hereunto subscribed my name this 8th day of August, 1912.

EWALD HÄHNLEN.

Witnesses:
E. M. TORMIN,
G. W. K. WOODWORTH.